United States Patent
Brunell et al.

(10) Patent No.: US 8,458,349 B2
(45) Date of Patent: Jun. 4, 2013

(54) ANONYMOUS AND SECURE NETWORK-BASED INTERACTION

(75) Inventors: Bradly A. Brunell, Medina, WA (US); Susan T. Dumais, Kirkland, WA (US); Joshua T. Goodman, Redmond, WA (US); Eric J. Horvitz, Kirkland, WA (US); Gary Flake, Bellevue, WA (US); Anoop Gupta, Woodinville, WA (US); Christopher A. Meek, Kirkland, WA (US); Ramez Naam, Seattle, WA (US); Kyle Peltonen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1 day.

(21) Appl. No.: 13/156,210

(22) Filed: Jun. 8, 2011

(65) Prior Publication Data
US 2011/0238829 A1 Sep. 29, 2011

Related U.S. Application Data

(62) Division of application No. 11/427,313, filed on Jun. 28, 2006, now Pat. No. 7,984,169.

(51) Int. Cl.
*G06F 15/16* (2006.01)
(52) U.S. Cl.
USPC .......................................... 709/229; 709/228
(58) Field of Classification Search
USPC .................................................. 709/228, 229
See application file for complete search history.

(56) References Cited

U.S. PATENT DOCUMENTS

| | | | |
|---|---|---|---|
| 5,493,692 | A | 2/1996 | Theimer et al. |
| 5,544,321 | A | 8/1996 | Theimer et al. |
| 5,555,376 | A | 9/1996 | Theimer et al. |
| 5,603,054 | A | 2/1997 | Theimer et al. |
| 5,611,050 | A | 3/1997 | Theimer et al. |
| 5,812,865 | A | 9/1998 | Theimer et al. |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,581,057 | B1 | 6/2003 | Witbrock et al. |
| 6,745,180 | B2 | 6/2004 | Yamanoue |
| 6,747,675 | B1 | 6/2004 | Abbott et al. |

(Continued)

FOREIGN PATENT DOCUMENTS
WO WO9800787 A1 1/1998

OTHER PUBLICATIONS

Billinghurst, et al., "An Evaluation of Wearable Information Spaces", Proceedings of the Virtual Reality Annual International Symposium, Mar. 1998, 8 pages.

(Continued)

*Primary Examiner* — Tammy Nguyen
*Assistant Examiner* — Jonathan Bui
(74) *Attorney, Agent, or Firm* — Lee & Hayes, PLLC

(57) ABSTRACT

The subject disclosure pertains to anonymous network interaction. More specifically, mechanisms are provided to ensure anonymity with respect network interaction such that third parties are unable to determine the source and/or intent of communications. Accordingly, entities may anonymize all outgoing and/or incoming data packets so as to mitigate outside entities from learning about information being sought and/or provided. For example, a user or corporation may employ an anonymizer with respect to web searching so that outside entities are not able to determine what information is attempted to be accessed and by whom.

20 Claims, 11 Drawing Sheets

U.S. PATENT DOCUMENTS

| | | | |
|---|---|---|---|
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 6,928,437 | B2 | 8/2005 | Shibuya et al. |
| 6,968,333 | B2 | 11/2005 | Abbott et al. |
| 7,007,228 | B1 | 2/2006 | Carro |
| 7,069,249 | B2 * | 6/2006 | Stolfo et al. ............... 705/74 |
| 7,469,299 | B2 | 12/2008 | Johnston |
| 7,536,360 | B2 * | 5/2009 | Stolfo et al. ............... 705/68 |
| 7,546,370 | B1 * | 6/2009 | Acharya et al. ............ 709/227 |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0038431 | A1 | 3/2002 | Chesko et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2002/0103806 | A1 | 8/2002 | Yamanoue |
| 2002/0116531 | A1 | 8/2002 | Chu |
| 2002/0174115 | A1 | 11/2002 | shibuya et al. |
| 2003/0009593 | A1 | 1/2003 | Apte |
| 2003/0028599 | A1 | 2/2003 | Kolsky |
| 2003/0037108 | A1 * | 2/2003 | Peiffer et al. ............... 709/203 |
| 2003/0046401 | A1 | 3/2003 | Abbott et al. |
| 2003/0080997 | A1 | 5/2003 | Fuehren et al. |
| 2003/0154476 | A1 | 8/2003 | Abbott, III et al. |
| 2003/0192050 | A1 | 10/2003 | Fellenstein et al. |
| 2004/0015580 | A1 * | 1/2004 | Lu et al. .................... 709/224 |
| 2004/0205198 | A1 | 10/2004 | Zellner et al. |
| 2004/0230820 | A1 * | 11/2004 | Hui Hsu et al. ............ 713/200 |
| 2005/0034078 | A1 | 2/2005 | Abbott et al. |
| 2005/0157706 | A1 | 7/2005 | Wang et al. |
| 2005/0283469 | A1 | 12/2005 | Veteska et al. |
| 2006/0059091 | A1 | 3/2006 | Wang et al. |
| 2006/0129642 | A1 * | 6/2006 | Qian et al. ................. 709/205 |
| 2006/0200432 | A1 | 9/2006 | Flinn et al. |
| 2006/0247982 | A1 * | 11/2006 | Stolfo et al. ............... 705/26 |
| 2006/0259957 | A1 | 11/2006 | Tam et al. |
| 2006/0265495 | A1 | 11/2006 | Butler et al. |
| 2006/0288000 | A1 * | 12/2006 | Gupta ............................ 707/5 |
| 2007/0220010 | A1 * | 9/2007 | Ertugrul ....................... 707/10 |
| 2007/0242493 | A1 | 10/2007 | Kuliyampattil et al. |
| 2007/0294762 | A1 | 12/2007 | Shraim et al. |
| 2008/0141117 | A1 | 6/2008 | King et al. |
| 2008/0196098 | A1 * | 8/2008 | Cottrell et al. ............... 726/12 |
| 2011/0213799 | A1 * | 9/2011 | Benson ...................... 707/769 |

OTHER PUBLICATIONS

Billinghurst, "Research Directions in Wearable Computing", University of Washington, May 1998, 48 pages.

Billinghurst, et al., "Wearable Devices: New Ways to Manage Information", IEEE Computer Society, Jan. 1999, pp. 57-64.

Chen, et al.,"A Survey of Context-Aware Mobile Computing Research", Dartmouth Computer Science Technical Report TR2000-381, Nov. 2000, 16 pages.

Harter, et al.,"A Distributed Location System for the Active Office", IEEE Network, Jan.-Feb. 1994, pp. 62-70.

Horvitz, et al., "Attention-Sensitive Alerting in Computing Systems", Microsoft Research, Aug. 1999, 8 pages.

Horvitz, et al., "In Pursuit of Effective Handsfree Decision Support: Coupling Bayesian Inference, Speech Understanding, and User Models", 1995, 8 pages.

International Search Report dated Sep. 29, 2003 for PCT Application Serial No. PCT/US00/20685, 3 Pages.

Joachims, "Text categorization with support vector machines: learning with many relevant features", Machine Learning, European Conference on Machine Learning, Apr. 1998, pp. 137-142.

Losee, Jr., "Minimizing information overload: the ranking of electronic messages", Journal of Information Science vol. 15, Issue 3, Elsevier Science Publishers BV, 1989, pp. 179-189.

Rhodes, "Remembrance Agent: A continuously running automated information retrieval system", The Proceedings of the First International Conference on the Practical Application of Intelligent Agents and Multi Agent Technology, Apr. 1996, pp. 487-495.

Rhodes, "The Wearable Remembrance Agent: A System for Augmented Theory", The Proceedings of the First International Symposium on Wearable Computers, Oct. 1997, pp. 123-128.

Rhodes, "The Wearable Remembrance Agent: A System for Augmented Memory", Personal Technologies Journal Special Issue on Wearable Computing (ISWC '97), Oct. 1997, 12 pages.

Schilit, et al., "Context-Aware Computing Applications", In Proceedings of the Workshop on Mobile Computing Systems and Applications, Dec. 1994, pp. 85-90.

Schilit, et al., "Customizing Mobile Applications", Proceedings USENIX Symposium on Mobile and Location Independent Computing, Aug. 1993, 9 pages.

Schilit, et al., "Disseminating Active Map Information to Mobile Hosts", IEEE Network, vol. 8, No. 5, Sep./Oct. 1994, pp. 22-32.

Schilit, et al., "The ParcTab Mobile Computing System", IEEE WWOS-IV, Oct. 1993, 4 pages.

Schilt, "A System Architecture for Context-Aware Mobile Computing", Columbia University, Doctoral Dissertation, May 1995, 153 pages.

Spreitzer, et al., "Architectural Considerations for Scalable, Secure, Mobile Computing with Location Information", in the 14th International Conference on Distributed Computing Systems, Jun. 1994, pp. 29-38.

Spreitzer, et al., "Providing Location Information in a Ubiquitous Computing Environment", SIGOPS '93, Dec. 1993, pp. 270-283.

Spreitzer et al., "Scalable, Secure, Mobile Computing with Location Information", Communications of the ACM, vol. 36—No. 7, Jul. 1993, 1 page.

Starner, "Wearable Computing and Contextual Awareness", Massachusetts Institute of Technology, Jun. 1999, 248 pages.

Theimer, et al., "Operating System Issues for PDAs", In Fourth Workshop on Workstation Operating Systems, Oct. 1993, 7 pages.

Thomason, "JavaScript Tip: Browser Detection and Redirection", Webmaster Tips, vol. 3, No. 15, Oct. 2001, pp. 1-3.

Want, "Active Badges and Personal Interactive Computing Objects", IEEE Transactions on Consumer Electronics, vol. 38, No. 1, Feb. 1992, 11 pages.

Want, et al., "The Active Badge Location System" ACM Transactions on Information Systems, vol. 10, No. 1, Jan. 1992, pp. 91-102.

Weiser, "Some Computer Science Issues in Ubiquitous Computing", Communications of the ACM, vol. 36, No. 7, Jul. 1993, pp. 75-84.

Weiser, "The Computer for the 21st Century", Scientific American, Sep. 1991, 8 pages.

Workshop on Wearable Computing Systems,"Schedule and Breakout Session Information", retrieved on Apr. 4, 2005 from <<http://wearcam.or/computing/workshop/schedule.html>>, Aug. 1996, 3 pages.

* cited by examiner

ANONYMOUS AND SECURE NETWORK-BASED INTERACTION

CROSS-REFERENCE TO RELATED APPLICATIONS

This patent application is a divisional application of, and claims priority to, co-pending, commonly-owned U.S. patent application Ser. No. 11/427,313, entitled "ANONYMOUS AND SECURE NETWORK-BASED INTERACTION", and filed on Jun. 28, 2006, which application is incorporated herein in its entirety by reference.

BACKGROUND

Ubiquitous network-based communications such as Internet transmissions can be utilized as a source of significant information about users. Amongst other things, device addresses, cookies and communications themselves can reveal information about users. Communication devices (e.g., computer, phone . . . ) are associated with a unique address, which like a postal address enables communications to be delivered to an appropriate device. This address can be employed to pinpoint the geographical location of a device and its user, among other things. Additionally, small text files called cookies including personally identifiable information can be created, transmitted and made accessible to applications. Moreover, communications themselves are more often than not transmitted in an unencrypted format. Accordingly, any intercepted or misdirected messages are easily comprehendible by unintended recipients.

As may be inferred, the type and amount of information revealed can depend on network applications. Consider search engines, for example. A search engine is a tool that facilitates web navigation based on entry of a search query comprising one or more keywords. The search engine retrieves and provides a list of websites, videos, images or the like, typically ranked based on relevance to the query. In addition to providing such useful functionality, search engines often maintain a pool of specific information regarding searches such the IP (Internet Protocol) address of a requesting device, time, date, and entered search terms, among other things.

While information provided during single communication interactions or sessions may not appear significant, such information when aggregated can paint a clear picture of a user and associated entities. In particular, data mining tools can be employed to correlate and learn information from a subset thereof. Such tools can be employed by malicious individuals to perpetrate identity fraud, advertisers for targeted advertising and government agencies for monitoring, among others. For example, a single cookie providing information such as a zip code may appear harmless but when combined with other information (e.g., cookies, address, search history) it can be used to identify a particular individual, their interests, and possibly intent. Furthermore, such an individual may be linked to an organization such as an employer and possibly reveal confidential and/or strategically sensitive information about the organization.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to anonymizing network-based interaction. Interacting or communicating over a network such as the Internet can result in vulnerability with respect to private or confidential information. Moreover, even when end users exercise caution and/or employ conventional security programs, they can be revealing information about themselves and intentions without their knowledge. For instance, information about a user can be obtained from his/her IP (Internet Protocol) address and interactions such as search engine queries can provide valuable information regarding that specific user's intent and/or interest. The subject innovation provides mechanisms to anonymize and secure network interaction such that others are not able to identify a user, information associated therewith and/or intent, among other things.

In accordance with an aspect of the subject innovation, an anonymizer component can be employed to anonymize a communication entity. The anonymizer component can employ one or more of a number of different schemes to affect anonymity within a degree desired by a user. In one instance, the anonymizer component can employ context information to determine whether or not a communication should be anonymized and if so to what extent.

According to another aspect of the innovation, analyses and/or simulations can be employed that inform a user about information being shared, and more generally, about the likelihood that different inferences might be made from a forthcoming interaction, even considering how inferences might be made should the next set of interactions be allowed to go forward, based on the data being shared then as well as a consideration of the history of data shared to date, among other things.

Further yet, the anonymizer can facilitate providing sensitive information to a communication party in a secure manner. Still further yet, such functionality can be applied in a manner that balances anonymity and adverse effects on communication functionality.

Although, the anonymizer can be applied with respect to a myriad of network communications and applications, in accordance with one aspect, the anonymizer can facilitate achieving anonymity with respect to use of search engines. In particular, source identifying information can be removed, altered or otherwise disguised. Further, search goals or intent can be obfuscated, for example by generating decoy queries.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
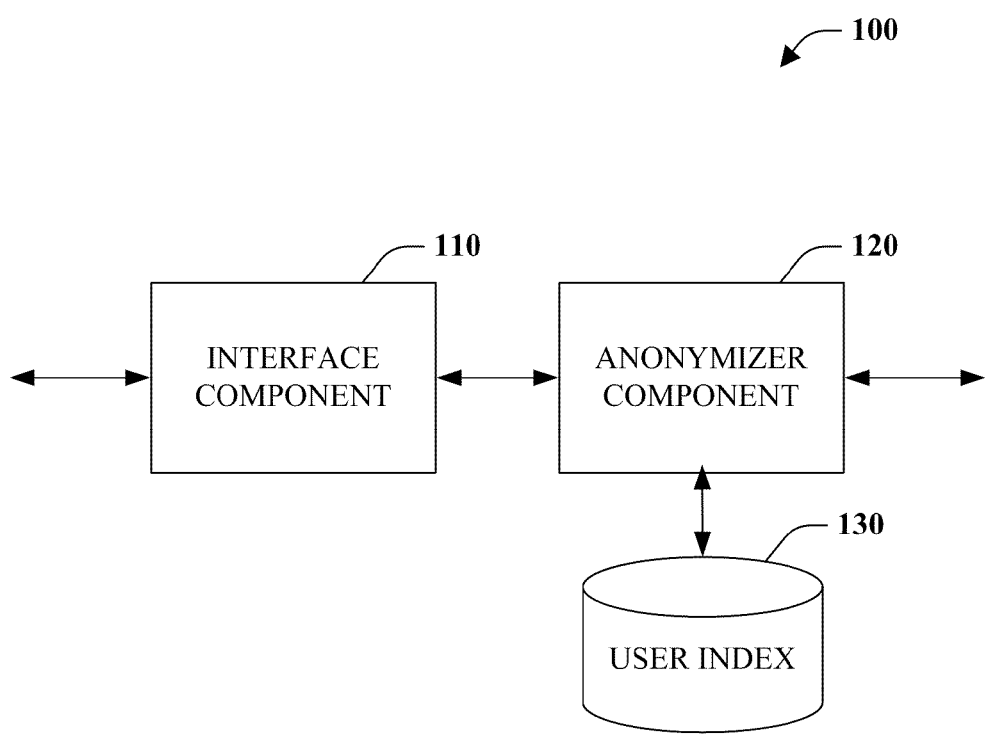
FIG. 1 is a block diagram of a system that anonymizes network interaction.

Referring initially to FIG. 1, a system 100 that facilitates anonymous network interaction is illustrated in accordance with an aspect of the subject innovation. Network interactions can include information about a user and/or associated organization directly or indirectly. Search queries, for instance, can provide context about intent and goals of a user or employer. Such contextual information may be considered confidential and/or strategically sensitive by the user or his/her employer. By way of example and not limitation, employees of a company may desire to obtain publicly available but rarely referenced details of a competitors product from the competitor's website, and might not want the competitor to know that they are searching for and/or examining these materials. System 100 provides a mechanism for preserving privacy with respect to network interaction including but not limited to search queries.

As shown, the system 100 includes an interface component 110 and an anonymizer component 120. The interface component 110 receives, retrieves or otherwise obtains or acquires a network (e.g., Internet, intranet, local area network, wide area network . . . ) based communication. For example, the interface component 110 could receive a search engine query, a web page request or VoIP (Voice over Internet Protocol) call, among other things. This received communication can then be transmitted to or made accessible by the anonymizer component 120. The anonymizer component 120 can anonymize a user and/or device such that a communication party and/or third parties are unable to identify the user and/or device participating in a communication session. Communications to a user, for example resulting from an initial communication, can be received by the anonymizer component 120 and routed back to an entity via the interface component 110.

According to an aspect of the innovation, system 100 can be implemented as a proxy system or service to which a user can subscribe to anonymize Internet-based communication. However, the subject innovation is not limited thereto. For example, in accordance with another aspect of the innovation, system 100 can be incorporated within or associated solely with a product like a search engine such that interactions (e.g., queries, results . . . ) with the search engine are anonymized. Additionally or alternatively, a computing device (e.g., computer, mobile phone, personal digital assistant . . . ) can include system 100 to ensure private communications.

The anonymizer component 120 can implement one or more of a myriad of schemes directed toward disguising or hiding information depending at least in part upon how system 100 is implemented (e.g., service, software product, device . . . ). Furthermore, varying degrees of anonymity can be provided by the component 120 based on one or more schemes selected for employment. In one instance, the anonymizer component 120 can recognize and strip communications of unnecessary identifying information. For example, the anonymizer component 120 can strip communications of all identifying indicia and retag them with other information in an attempt to disguise identity. In such an instance, the anonymizer component 120 can store the stripped data as well as the retagged information in user index store 130. The user index 130 can thus house a mapping of information that can be utilized to aid providing users with requested or otherwise received response communications. Additionally or alternatively, the anonymizer component 120 can modify provided information and/or prohibit access.

Network communications provide a variety of sources of indicia that alone or in combination can be used to glean information about a user or communicating entity. The anonymizer component 120 operates with respect to these sources. The sources of indicia include but are not limited to IP (Internet Protocol) addresses, referrer tags, transaction information such as client and accept header fields and cookies.

An IP address is a unique numeric identifier associated with a network communication device. In addition to identifying a particular device, such an identifier can be utilized to obtain various other information including but not limited to location (e.g., country, region, area code, zip code, city . . . ), ISP (Internet Service Provider), organization and domain name. Accordingly, it is desirable to anonymize with respect to an IP address. By way of example and not limitation, the user index store 130 can include a plurality of IP addresses associated with the system 100. The anonymizer component 120 can hide information associated with an IP address by, among other things, mapping a communication IP address to an alternate address. Thus, an eavesdropping third party utilizing geolocation software, for instance, would see a communication utilizing one of a plurality of system 200 addresses rather than the actual IP address uniquely identifying a user device, network, organization, location or the like. If the anonymizer component 120 receives a response to an initial anonymized communication it can identify the system IP address and look-up the associated user device address and transmit the response back to the user device via interface component 110.

Furthermore, it should be noted that rather than simply associating a single alternate address with a user to employ for communications, various addresses can be utilized to provide an additional level of security with respect to identity. A different IP address could be selected randomly or pseudo-randomly for each communication transaction (e.g., query/response, webpage request/response, VoIP call . . . ). The IP address for a user device could be stored only temporarily to enable responses to be provided and then erased or written over. In this manner, even the anonymizer component 120 could not be able to determine which communications are associated with a particular user device, network or the like, especially where a user is not specifically identified to the anonymization system 100.

Referrer tags disclose the identity of the last web page visited. When a user navigates from a first web page to a second web page, a tag is generated and attached to the communication requesting the second web page, which identifies the linking web page. In this manner, the second web page is informed of the first. The anonymizer component 120 can remove or alter this information from the communication to prevent transmission thereof.

In all HTTP (HyperText Transfer Protocol) transactions, there is a client header field and an accept header field. The client field specifies the client browser version that a user is employing and may include information like plug-ins, among other things. The accept field lists browsing related software and versions that are present on a user's machine (e.g., Flash, Shockwave . . . ). In some cases, information provided by one or both of the client and accept fields can provide a unique signature for a user. In other situations, it might provide a unique signature for an associated organization such as a corporate employer. Accordingly, the anonymizer component 120 provides a mechanism for removing or augmenting this information.

Cookies are the most commonly used source of identifying indicia. A cookie is a small text file that is often times stored on a computer to facilitate a more personalized experience. Cookies are stored as identifier, value pairs, where the identifier is uniquely identifies a user and the values provide personally identifiable information (PII) including but not limited to one or more of user name, postal address, email address, phone number, social security number, credit card information and preferences. In first time a user visits a site, the site can deposit a cooking on the communication device with a unique id. The user can then be followed or tracked on subsequent visits. Most browsers provide the ability to block cookies. However, blocking cookies is not without its costs, for instance with respect to loss of functionality and/or personalization.

The anonymizer component 120 manages cookies and therefore provides better control over information resident therein. In one instance, the anonymizer component 120 govern access to and use of cookies. For example, component 120 can refuse to persist cookies with particular types of information. Further, programs can be restricted from viewing only cookies that they generated to prevent mining of information. In this case, the anonymizer component 120 can identify the entity that created the cookie and upon verification provide the cookie back to the same requesting entity. Additionally or alternatively, the anonymizer component can delete cookies periodically to mitigate the risk of exposing personal information.

The anonymizer component 120 can also control information provided to scripting languages such as JavaScript. Scripting languages can query characteristics of a user's machine such as screen size. When correlated with other information, this may help reveal a users identity even if IP addresses, etc. are being shielded. While the anonymizer component can simply block access to information by scripting languages, this may significantly impact functionality. Hence, the anonymizer component 120 can block some information while allowing other information. Further, some data can be augmented to help obfuscate user identity while still allowing useful functionality.

In yet another instance, a location of a user, as tracked by GPS or like systems, can be disguised by the anonymizer component 120. Mobile devices (e.g., computers, phones, PDAs . . . ) can utilize such technology to provide location information in order to receive geographically relevant query results. In one instance, the anyonmization could be binary such that either the location is able to be determined or it is not. Alternatively, the anonymization can be scalar with respect to coarseness of location information (e.g., a state, a metro area, city, feet, inches . . . ). More particularly, the anonymizer component 110 can facilitate enabling, disabling or scrambling tracking signals to affect a particular level of ambiguity. Accordingly, the anonymizer component 120 can engage in a cost benefit analysis with respect to the sensitivity of a query and need for location sensitive results to determine how to appropriately anonymize a location.

Furthermore, it should be appreciated that the functionality of the anonymizer component 120 can also be type specific. As an example, consider a situation where the network interaction is a VoIP call. Here, the anonymizer component 120 can strip and/or modify unnecessary identifying information such as the caller name and telephone number. Additionally, the anonymizer component 120 can remove a called entity's nonessential identifying information. This would make it more difficult for a third party eavesdropper to identify communication participants.

Figure 2:
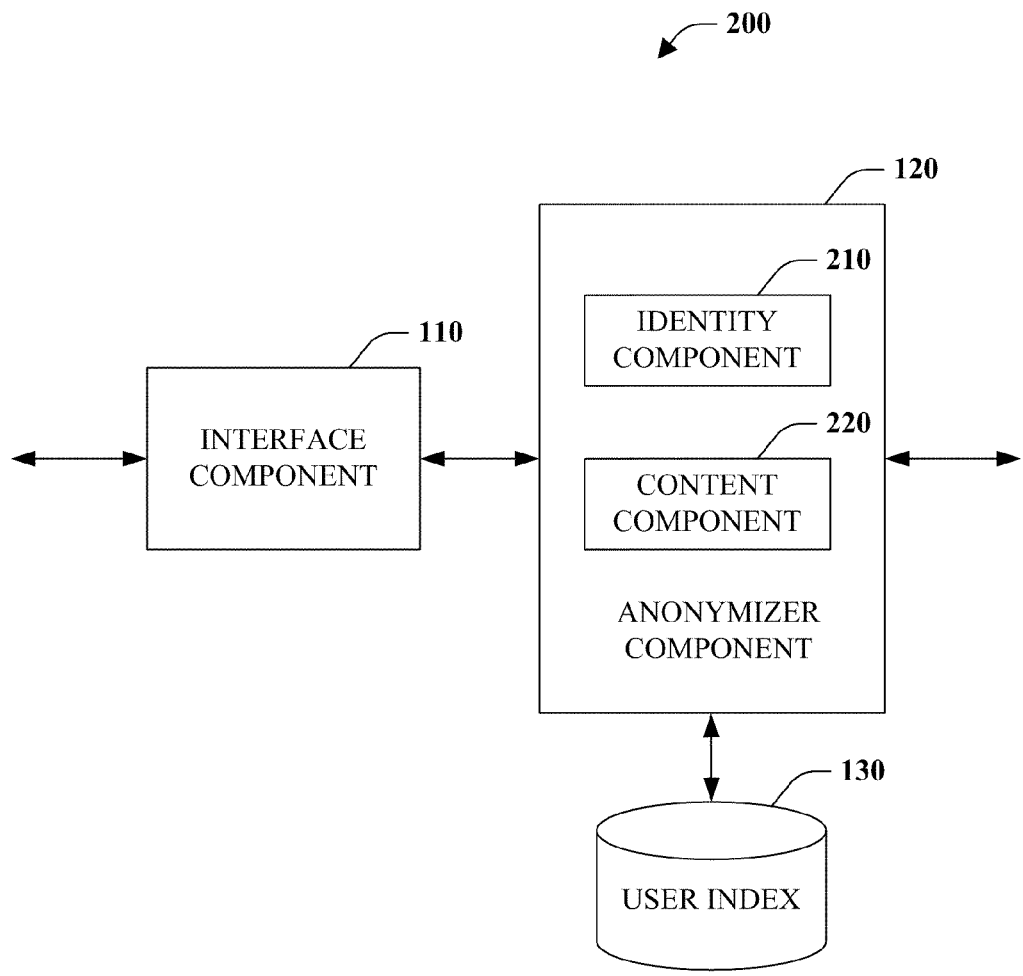
FIG. 2 is a block diagram of a system that anonymizes identity and intent associated with network interaction.

Turning to FIG. 2, a system 200 that anonymizes network interaction is depicted in accordance with an aspect of the innovation. Similar to system 100 of FIG. 1, system 200 includes interface component 110, anonymizer component 120 and user index component 130. As previously described, the interface component 110 can receive or retrieve a network communication (e.g., data packet) and provide the communication to the anonymizer component 120. The anonymizer component 120 filters information, optionally employing the user index 130, and transmits the communication to its destination. The anonymizer component 120 can include two subcomponents namely, identity component 210 and intent component 220. The identity component 210 can provide the functionality previously described with respect to system 100 of FIG. 1. In particular, identity can be anonymized by, among other things, stripping identification information and/or modifying information to disguise a user, device or the like. The intent component 220 can anonymize user intent associated with a communication. This can be accomplished in a number of ways. In one instance, inert data can be added to a communication to obfuscate intent. For example, if the communication corresponds to a search query, inert search terms can be added to a query in an attempt to disguise the intent of the search. Additionally or alternatively, spurious data packets can be periodically transmitted so as to make it difficult for a third party to distinguish between genuine and imitation data packets. The number and content of such spurious data packets can also be designed to hide user content. For example, if it were determined that a user's search queries tend to be focused on a particular technology, then a number of spurious queries for alternate technologies can also be generated to cast doubt on the technology of interest to a user.

Figure 3:
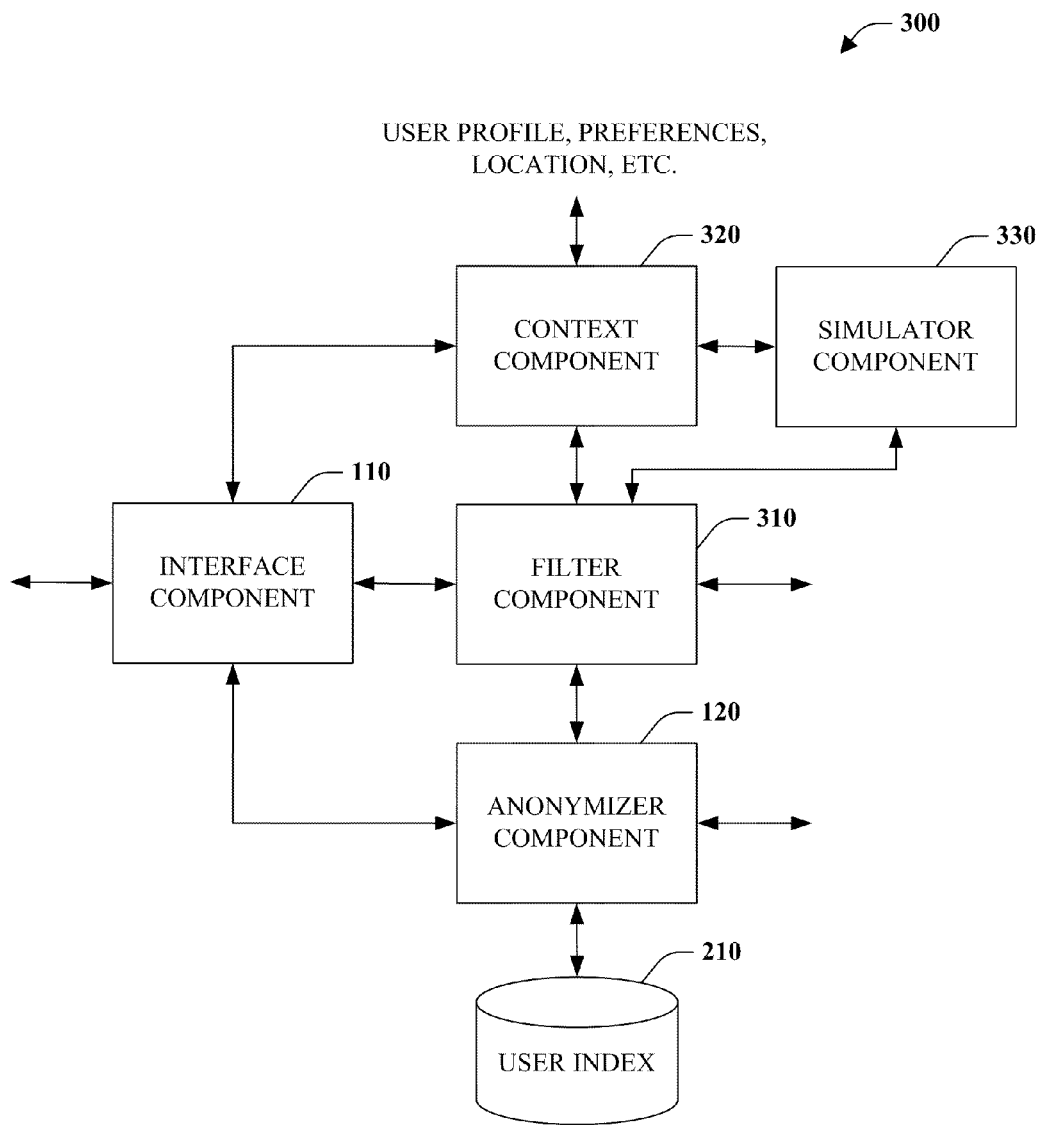
FIG. 3 is a block diagram of an adaptive anonymization system.

FIG. 3 illustrates an adaptive anonymization system 300 in accordance with an aspect of the subject innovation. System 300 includes the interface component 110, anonymizer component 120 and user index 120 as described supra with respect to systems 100 and 200 of FIGS. 1 and 2, respectively. Additionally, system 300 includes a filter component 310 and a context component 320. The filter component 310 is communicatively coupled to the interface component 110, the anonymizer component 120 and the context component 320. In operation, the filter component 310 can facilitate adaptive anonymization of communications based on context and/or user command.

It is to be appreciated that communications need not be anonymized to the same extent in every case as this may be an inefficient use of resources and/or adversely impact communication. For instance, a user may not be concerned to the same extent, if any, with anonymity for insignificant searches such as for local restaurants, while they may want to be anonymous with respect to searches for racy material. In addition, there may be some latency associated with anonymizing communications that could be avoided to provide a better user experience. Further, anonymization functionality may be billed based number of communications anonymized such that it would be unnecessarily costly to ensure anonymity for all communications. Still further yet, anonymization at higher levels may negatively affect communications, for example by disabling useful functionality. For at least the aforementioned reasons, the filter component 310 is designed to facilitate adaptive anonymization based on user command/ indication or context and/or circumstances surrounding a communication as provided by context component 320.

Context component 320 can receive, retrieve or otherwise acquire or infer (as that term is defined herein) context information associated with a communication. Accordingly, the context component 320 is coupled to the interface component 110 to facilitate analysis of communications obtained by the interface. The context component 320 can also receive or retrieve various other types of context information including but not limited to user profile information (e.g., age, gender, education, occupation, ethnicity, group affiliation . . . ), preference data (e.g., identifying when to anonymize and when not . . . ), location, temporal and historical data as well as device and system information. Furthermore, the context component 320 can infer context information based on other context information, utilizing rule or knowledge based systems and/or machine learning technologies. For example, if a user prefers to be anonymous with respect to a particular communication, then it can be inferred that they may want to be anonymous with respect to other like communications.

The filter component 310 can receive or otherwise acquire context information from the context component 320. Based on such information, the context component 320 can intelligently decide whether or not to anonymize the communication. If it is determined that the communication is not to be optimized, for example based on user preferences or decision analysis of other context information, then the filter can simply allow the communication to pass to a destination without action thereon. Alternatively, if a communication is determined to be appropriate for anonymizing, then the filter component 310 can provide the information provided or received from the interface component 110 to the anonymizer component 120. The communication can subsequently be anonymized and transmitted to a target destination. Filter component 310 can also determine an appropriate level of anonymity for a communication from context and provide that information to the anonymizer component 120. The anonymizer component 120 can utilize such an anonymity metric or other information to aid in selection and application of anonymization schemes and functionality. For instance, based on a low level of sensitivity with respect to information be transferred, the anonymizer component may decide simply to remove unnecessary identifying information rather than completely disguising identity.

In one particular implementation, the filter component 310 can specify an optimal anonymity metric value that maximizes anonymity while also minimizing negative impact on communication functionality. For instance, ideally, transmission of all personally identifying information (e.g., via cookies, JavaScript, client header accept field . . . ) should be blocked with respect to web browsing. One side effect of that is that web surfing then becomes much less valuable. For example, if the accept header field is modified to denote that a user cannot use a particular application like a flash player, then a contacted web server will likely not deliver flash content. However, the subject innovation facilitates a more sophisticated browsing strategy in which the anonymizer component 120 can modify, randomize and/or delete privacy revealing information in a manner designed to minimize the adverse impact on a user's browsing behavior. In particular, it can be detected and communicated, for example via context component 320 and filter component 310, whether content and/or functionality is affected and by which information (as well as to what extent). For instance, while many sites use tracking cookies, they may not deliver different content for devices that accept cookies. The anonymizing component 120 can then block cookies only for those sites whose behavior is unchanged. Similarly, some sites use a Flash component and others use the Shockwave component, but few use both. The anonymizing component 120 may determine which parts of the accept header field are likely to influence the content delivered by a website and deliver only the parts of the accept header that influence that part. The anonymizer component 120 can also randomize values in minor ways. For example, if two browser versions have almost identical functionality, the anonymizer component 120 can randomly return one or the other browser id. Further, JavaScript can request information regarding a user's screen size. There is typically little harm in returning a somewhat smaller screen size. Hence, the anonymizer component 120 can randomly return a slightly smaller screen size or similar information to a requesting script.

As previously mentioned, the adaptive anonymization system 300 also supports manual activation of anonymizing functionality as an alternative or to supplement automated anonymization. By way of example, consider a scenario where a search is performed utilizing a mobile phone or PDA. A user could select a button or use a voice command to indicate that one or more subsequent queries are to be anonymized. Alternatively, the phone or PDA could automatically detect when anonymization functionality should be activated based on context and user preferences. For instance, if a political strategist is seeking information about and another party's candidate, he/she, the device, or the device service provider may initiate anonymization of such a search. Consequently, the political strategist's identity and/or the query can be disguised with respect to such a query. Furthermore, it should be appreciated that the degree of anonymity provided could vary based on the information sought and/or the particular candidate amongst other contextual information.

The adaptive anonymization system 300 can also include and/or be communicatively coupled to a simulator component 330. Component 330 can perform analyses and/or simulations to help predict if and/or particular information and anonymity levels among other things may effect anonymization in the future and/or inferences that can be made about a user. For instance, the simulator component 330 can inform a user and/or the filter component 320 about information being shared, and more generally, about the likelihood that different inferences might be made from a forthcoming interaction, even considering how inferences might be made should the next set of interactions be allowed to go forward, based on the data being shared then as well as a consideration of the history of data shared to date. The simulator component 330 can also make recommendations on modification of an interaction, for instance to filter component 330, to lower the probability that particular inferences might be made. The component 330 can report the likelihood that various inferences about identity, goals, etc., might be made, and can also make recommendations about changes in the nature, timing, or target of the interaction to minimize undesired inferences. An automated simulation of revealed properties can be guided by specific privacy goals asserted by a user, and/or real-time statements and/or modifications of such longer-term privacy goals, identified via dialog with the user in the context of an interaction, among other things. It should be noted that simulator component 330 can be local (e.g., on client) and/or distant (e.g., on a server, part of a web service . . . ).

Figure 4:
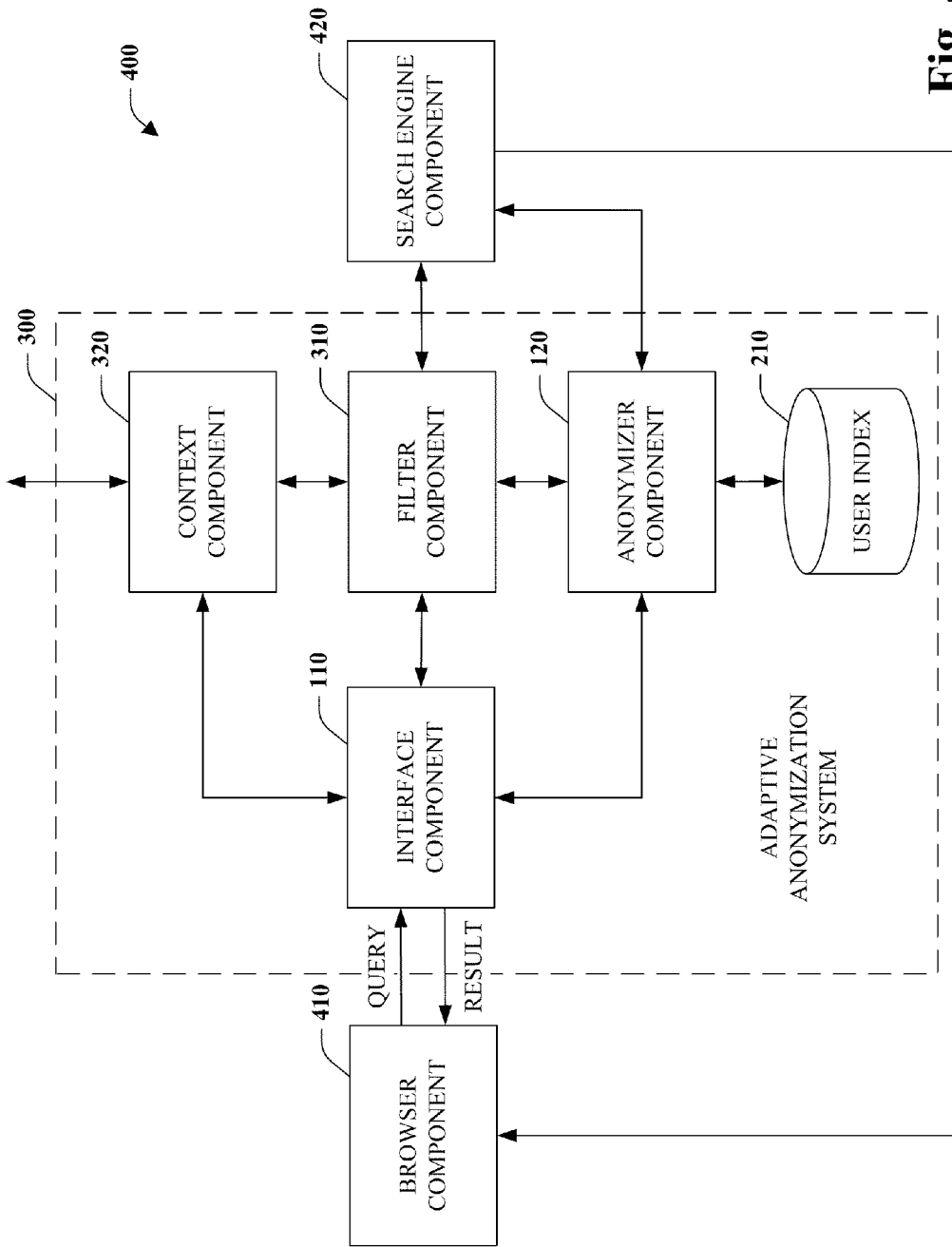
FIG. 4 is a block diagram of an exemplary web search system employing adaptive anonymization.

Turning attention to FIG. 4, an exemplary web search system 400 is illustrated in accordance with an aspect of the subject innovation. System 400 includes a web browser component 410 that seeks to communicate with search engine component 420. Here, the browser component 410 can employ, as proxy (e.g., local or remote), the adaptive anonymization system 300 of FIG. 3, as previously described.

The browser component 410 (e.g., Internet Explorer, Netscape, Mozilla, FireFox, Safari . . . ) provides a mechanism for displaying and interacting with data provided by way of a webpage at website located on the web or local area network (LAN). Here, the browser component 410 receives a web query and will ultimately render or display results for the query. Rather than providing a query directly to the search engine component 410 for evaluation, the browser component 410 provides the query to the selective anonymization system 300 via interface component 110. This browser 410 to interface 110 communication can be secured (e.g., SSL, S-HTML . . . ) or unsecured. If secured, the interface component 110 can decrypt the communication. Subsequently or concurrently, the filter component 310 can analyze the communication request provided by the interface component 110 with respect to various context information supplied by context component 320. Based on the query and/or other context information (e.g., user profile, preferences, location . . . ), the filter component can determine whether or not this query request communication should be anonymized and if so to what extent. If the communication is not to be anonymized, then the query request can be passed to the search engine component 420 without action as if the communication was provided directly to the search engine component 420. Responses to the communication, namely search results, would then be provided directly back to the browser component 410. If the filter component 320 determines that the communication should be anonymized, then this information and optionally a degree of anonymization can be communicated to the anonymizer component 120. The anonymizer component 120 can receive the query communication from the interface component 110 and anonymize the communication, perhaps employing user index 130, as previously described. The anonymized query communication can then be provided to the search engine 420. Upon query evaluation, results can be provided either directly to the user or back to the user via the selective anonymization system 300 depending on the level of anonymity employed.

It is to be appreciated that while system 400 illustrates the adaptive anonymizer system 300 as a separate service from both the browser component 410 and the search engine component 410, the subject innovation is not limited thereto. For instance, the anonymizer system 300 can be incorporated within or otherwise tied to interaction with the search engine component 420. By way of example, upon accessing the search engine component 420, the component 420 may automatically invoke some or all anonymizing functionality to facilitate ensuring anonymity with respect to search queries.

As a more specific example of the use of adaptive system 400, consider cookie management once again. Note that often user preferences associated with applications such as browsers are stored in a cookie. If all cookies are blocked, user preferences may not be able to be set and certain functionality may be adversely affected. For example, a user might want to be anonymous while they browse for adult oriented information. By default, adult information is blocked on most search engines. Thus, a user must set preferences on most search engines to allow adult content. However, this information is associated with a unique value stored in a cookie. The user is thus presented with a Catch-22: Either he can give up some level of anonymity by allowing all his adult searches to be tracked and correlated, or he can block cookies in which case the search engine will likely block his adult searches. System 300 enables a more sophisticated solution. The context component 320 can monitor user traffic and determine preference information that has been set. The anonymizer component 120 can then periodically delete the current cookies, request a new cookie and take actions to associate a user's preferences (e.g., to allow adult content) to be associated with the new cookie. Most search engines have a variety of preferences that might be configured and employed in this manner including but not limited to language and the number of search results to return. Other applications utilize cookies in a similar way.

Figure 5:
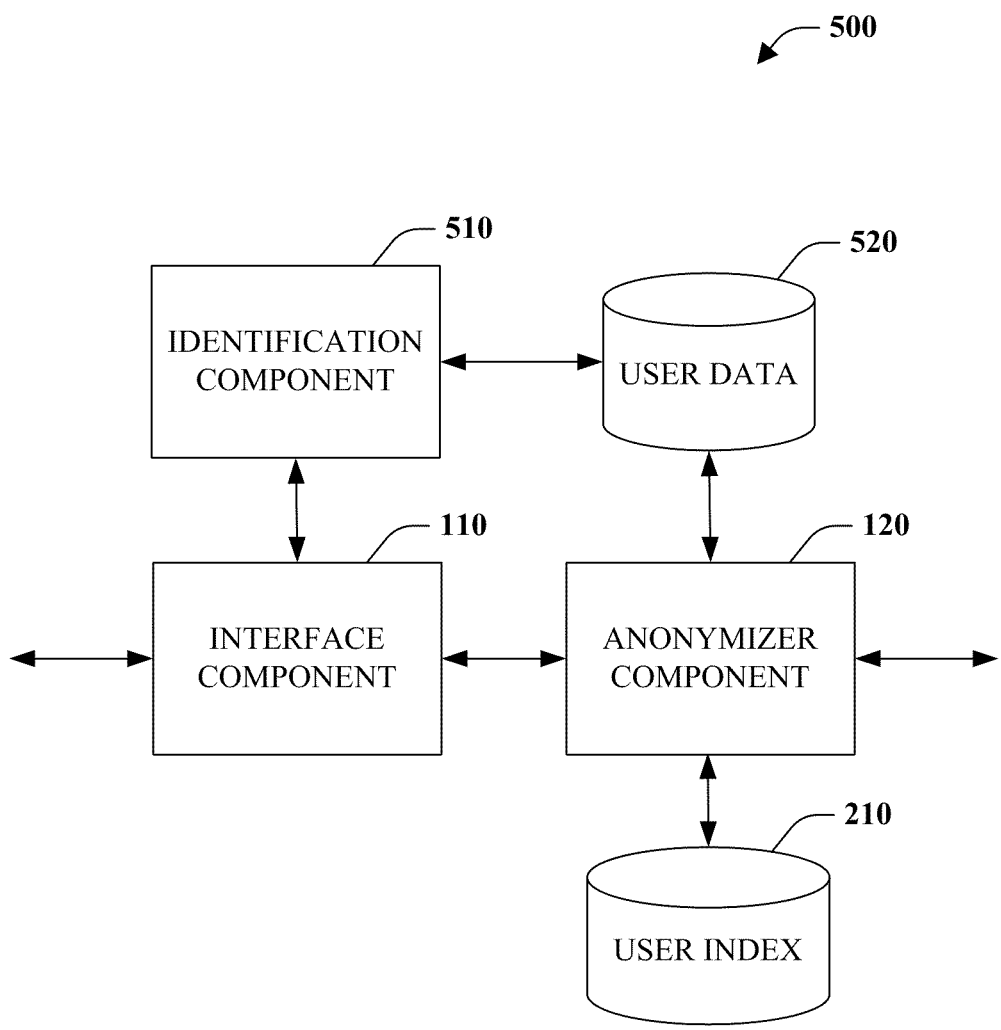
FIG. 5 is a block diagram of an anonymizer system that facilitates selective masking of user information.

FIG. 5 depicts an anonymization system 500 in accordance with yet another aspect of the subject innovation. An anonymization system may not be privy to user information in one implementation, except perhaps what it can glean from communications. However, such system can also include user information and selectively mask the information depending on degree of anonymity to be provided. System 500 supports selective masking of user information. As illustrated, system 500 includes an interface component 110, anonymizer component 120 and user index component 130, as previously described. In addition, the system 500 can include identification component 510 and user data housed in user data store 520. The identification component 510 is communicatively coupled to the interface component and is operable to request and/or receive or retrieve user identifying information. Identifying information such as user name/password can simply be entered utilizing the interface component 110. Furthermore, additional hardware/software can be utilized with the interface component 110 to enable more sophisticated identification techniques to be employed including but not limited to smart cards and biometrics (e.g., fingerprint, hand, voice, facial, retina, signature, keystroke recognition . . . ). Upon receipt or retrieval of identifying information, the identification component 510 can verify user identity based on information housed in user data store 520. Once validated, a user can interact with their data persisted on store 520. For example, they can add and/or modify profile (e.g., name, age, gender, occupation, group affiliations . . . ), secure (e.g., credit card, username/passwords . . . ), and/or preference (e.g., data to be provided to entities) data, among other things. Furthermore, once validated user data from store 520 can be made available for employment by the anonymizer component 120.

For example, consider a communication transaction that corresponds to a retrieval of a secure webpage that requires particular information such as a user name and password. In this case, the anonymizer component 120 can query the user data to determine which information is allowed to be transmitted with respect to the transaction, retrieves such information, provides it to a designated webpage and returns the secure webpage to the user via interface component 110. Similarly, credit card and other information may be automatically provided for designated web pages by the anonymizer component 120. By contrast, the anonymizer component 120 can block or refuse to provide data to a requesting webpage where it is not designated to receive such information. However, the anonymizer component 120 may cause the user to be prompted via interface component 110 asking the user whether they would like to provide such information to a particular entity. Based on this interaction, the anonymizer can automatically updated such preferences in the user data store 520 to enable future interactions to proceed without soliciting a user. Thus, the anonymizer component 120 can act as a filter that provides a degree of anonymity dependent upon user specification/authorization.

Figure 6:
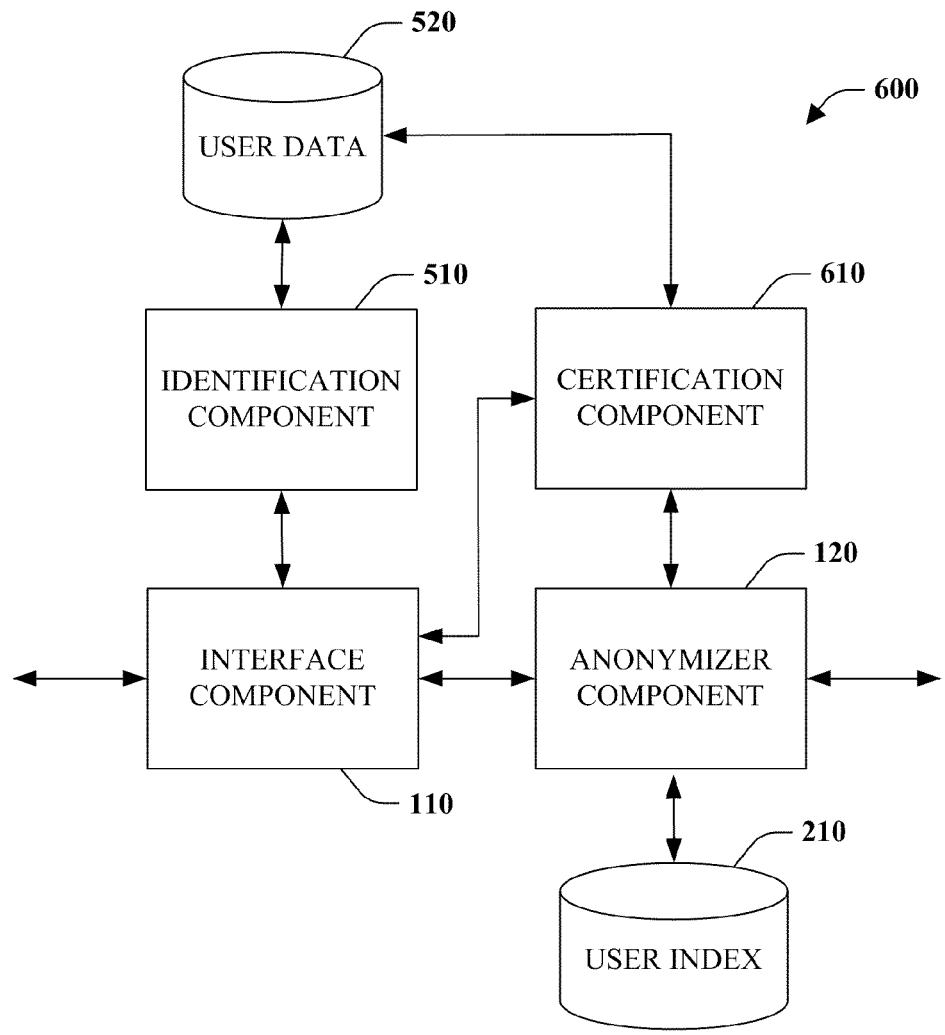
FIG. 6 is a block diagram of an anonymizer system that employs certification.

Referring to FIG. 6, an anonymization system 600 is illustrated in accordance with an aspect of the subject innovation. Similar to system 500 of FIG. 5, system 600 includes interface component 110, anonymizer component 120, user index store 130, identity component 510 and user data store 520. In brief, the interface component 110 can receive communications and provide them to anonymizer component 120 for anonymization, for example by utilizing user index store 130. Further, the interface component 120 can interact with the identity component 510 to facilitate validating a user identity. The user data store 520 can contain data utilized for validation as well as information associated with a user.

Additionally, system 500 includes a certification component 610 communicatively coupled the anonymizer component 120, user data store 520 and interface component 110. To preserve anonymity, users may prefer not to supply any identifying information. However, communication partners may not desire to communicate with truly anonymous entities. To remedy this predicament, certification via certification component 610 can be utilized.

Certification component 610, upon user authorization, can interrogate the user data store 520 to determine if a user has particular qualities and/or satisfies certain conditions. User authorization can be provided by a user allowing the certification component to access store 520 or providing such information directly, for instance via interface component 110. Further, the certification component 610 may require and provide and/or employ mechanisms to verify user provided data. For instance, the certification component 610 may ask a user questions, require additional information and/or check for data consistency. By way of example, user credit card information may be required to corroborate a user name and/or group identification (e.g., employee id . . . ) may be needed to verify group membership (e.g., employment . . . ), among other things. Once the certification component 610 is satisfied within a degree of certainty that a user satisfies certain conditions, the component 610 can certify the user. During a communication transaction or session, a party may request a particular certification. The anonymizer component 120 can contact the certification component 610 and retrieve a certificate that can be provided to the party as proof of satisfaction of particular requirements. The certificate thus indicates that a communication partner satisfies some conditions but does not specifically identify the individual.

It should also be appreciated that the certification component 610 can be operated by a trusted third party. Further, the certificate can simply be a value that a party can then validate with the third party. Thus, the anonymizer component 120 can retrieve and provide a certificate value that a communication party can trust on its face or verify with the third party. Upon verification, a party may then proceed with communication.

The aforementioned systems have been described with respect to interaction between several components. It should be appreciated that such systems and components can include those components or sub-components specified therein, some of the specified components or sub-components, and/or additional components. For example, system 500 and 600 can also include the filter component 310, context component 320, and simulator component 330. Sub-components can also be implemented as components communicatively coupled to other components rather than included within parent components. Further yet, one or more components and/or sub-components may be combined into a single component providing aggregate functionality. For instance, the simulator component 330 can be incorporated within the filter component 320 and/or anonymizer component 120. Similarly, one or more components can be separated into sub-components operable to perform specific functionality. For example, anonymizer component 120 can include sub-components for disparate anonymization techniques such as removing referring tags modifying client and accept headers, augmenting responses to scripts and cookie management. The components may also interact with one or more other components not specifically described herein for the sake of brevity, but known by those of skill in the art.

Furthermore, as will be appreciated, various portions of the disclosed systems above and methods below may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the context component 320 can employ such methods and mechanisms infer context from incomplete information. Similarly, the anonymizer component 120 can learn and employ user preferences from historical interaction information.

Figure 7:
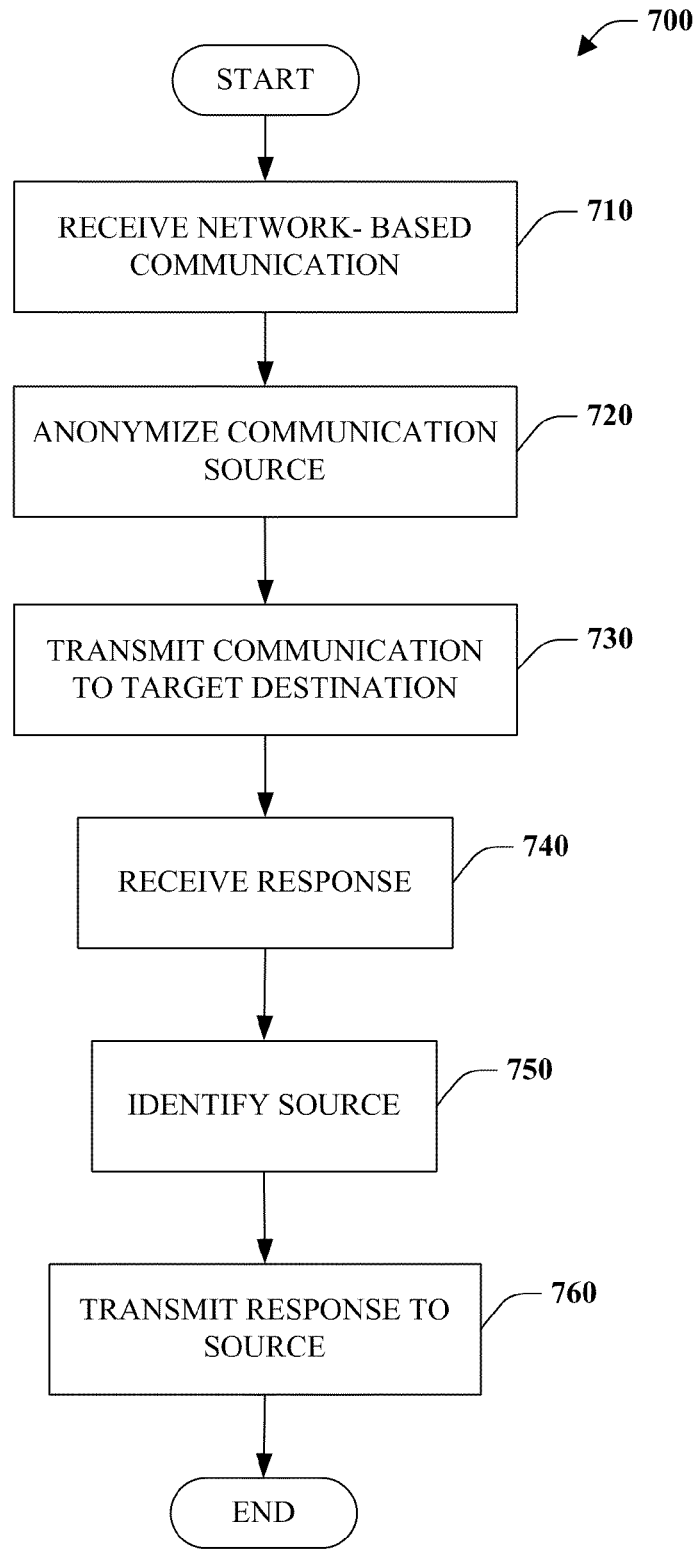
FIG. 7 is a flow chart diagram of a method anonymizing network-based communications.
Figure 8:
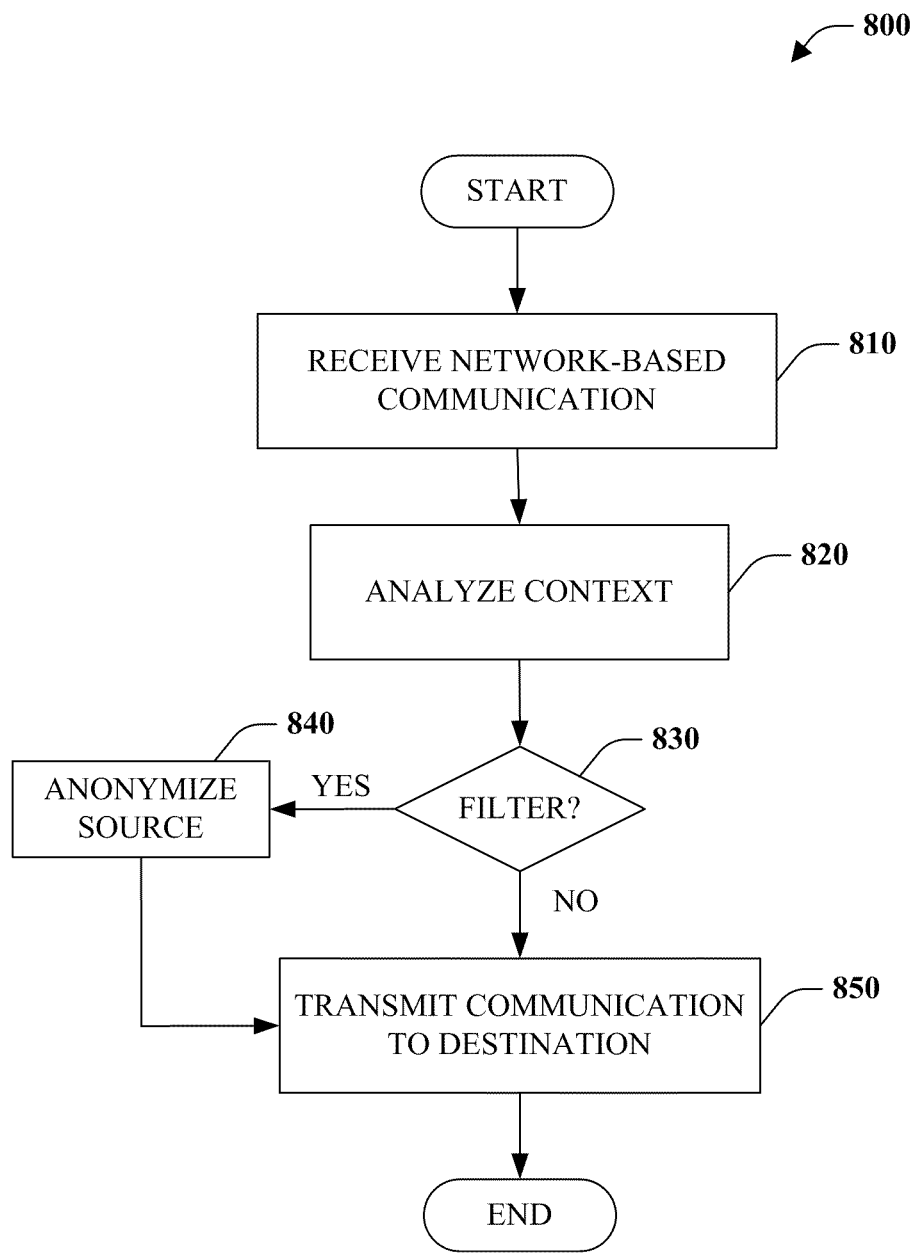
FIG. 8 is a flow chart diagram of a method of selectively anonymizing Internet based communications.
Figure 9:
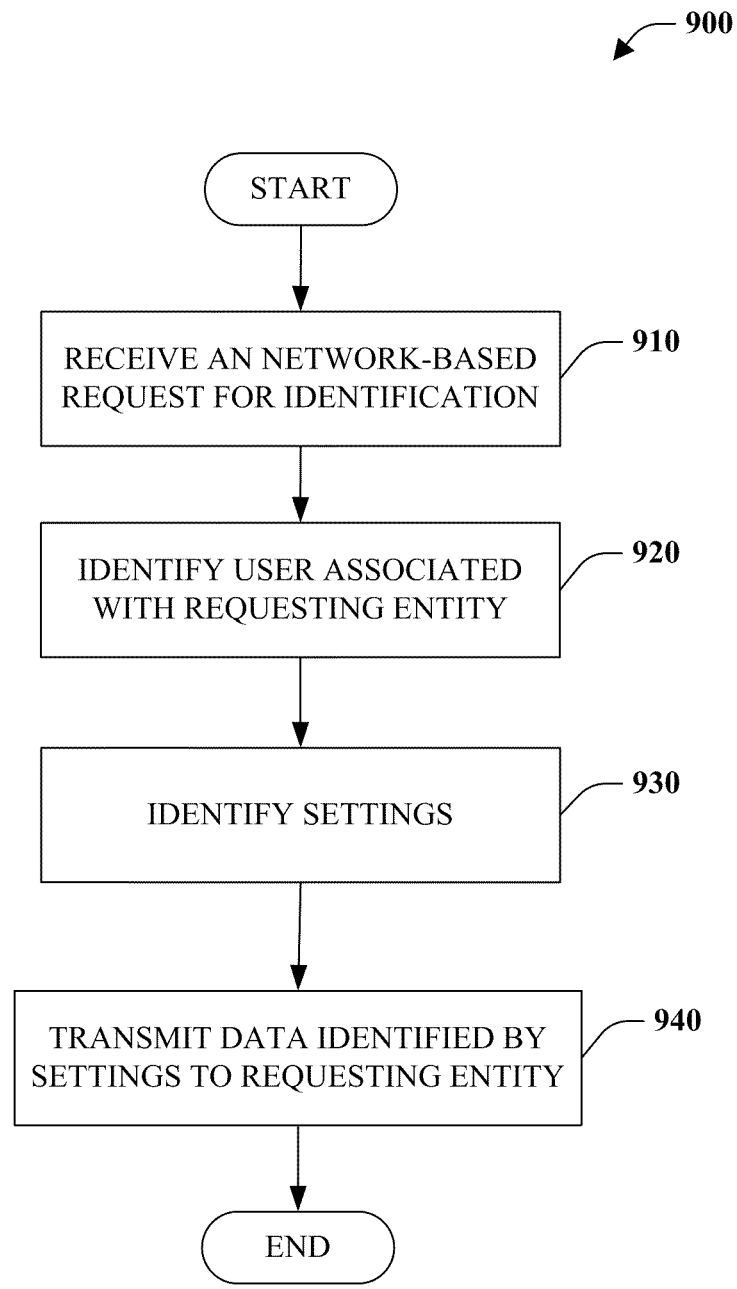
FIG. 9 is a flow chart diagram of an anonymization method of selectively masking information.

In view of the exemplary systems described supra, methodologies that may be implemented in accordance with the disclosed subject matter will be better appreciated with reference to the flow charts of FIGS. 7-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

Referring to FIG. 7, a method 700 of anonymizing network-based communications is illustrated. At reference numeral 710, a network-based communication is received such as a web query. At numeral 720, the communication source is anonymized. For example, unnecessary identifying information is removed or all identifying information can be removed and replaced with other data unrelated to the source. At 730, the anonymized data is transmitted to the designated target such as a search engine. A response is received, such as query results, at 740. At reference numeral 750, the anonymized source associated with the response is identified. The response is then transmitted back to the source at numeral 760. According to an aspect of the innovation, the method 700 can be a proxy methodology that provides a layer of indirection between communication parties to facilitate anonymization of identity and/or intent. For instance, the method can be performed by a dedicated company server to anonymize all data packages to and from its network computers. Alternatively, the method 700 can be performed within a computing device and/or by a specific device application.

FIG. 8 depicts a method 800 of selective anonymization in accordance with an aspect of the subject innovation. At reference numeral 810, a network-based communication is received. Context information associated with a source and/or the communication is received or retrieved and analyzed at 820. At reference numeral 830, a determination is made as to whether the communication should be filtered based on the context. If yes, the method proceeds to 840 where the communication is anonymized in one or more of various manners (e.g., stripping or modifying IP address, headers, cookies, scripts . . . ), for instance depending on the context. For example, the communication may be anonymized in such a manner that minimized adverse affects of communication functionality. Subsequently, the method continues at 850 where the anonymized communication is transmitted to a target destination. If, at 840, the communication is not to be filtered, then the method advances to 850 where the communication is simply transmitted to a destination.

Turning attention to FIG. 9, an anonymization method 900 for selectively masking information is illustrated in accordance with an aspect of the innovation. At reference numeral 910, a network-based request for information is received in response to a request for information such as a web page or a query, among other things. At 920, the user associated with a requesting entity is identified. For example, this user may have initiated communication with the requesting entity. At reference numeral 930, settings associated with the user are identified. The settings can indicate which type or specific data can be provided to the requesting entity. For example, this can be specific user information (e.g., name, user name, password, credit card information . . . ) or a more general certification. Subsequently, the appropriate information, as specified by the settings, is transmitted to the requesting party. In this manner, the method 900 enables a user to keep information private at least with respect to particular entities, while still allowing possibly the same information to be provided to designated entities.

As used in herein, the terms "component," "system" and the like are intended to refer to a computer-related entity, either hardware, a combination of hardware and software, software or software in execution. For example, a component may be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Artificial intelligence based systems (e.g., explicitly and/or implicitly trained classifiers) can be employed in connection with performing inference and/or probabilistic determinations and/or statistical-based determinations as in accordance with one or more aspects of the subject innovation as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a system, method, apparatus, or article of manufacture using standard programming and/or engineering techniques to produce software, firmware, hardware or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 10:
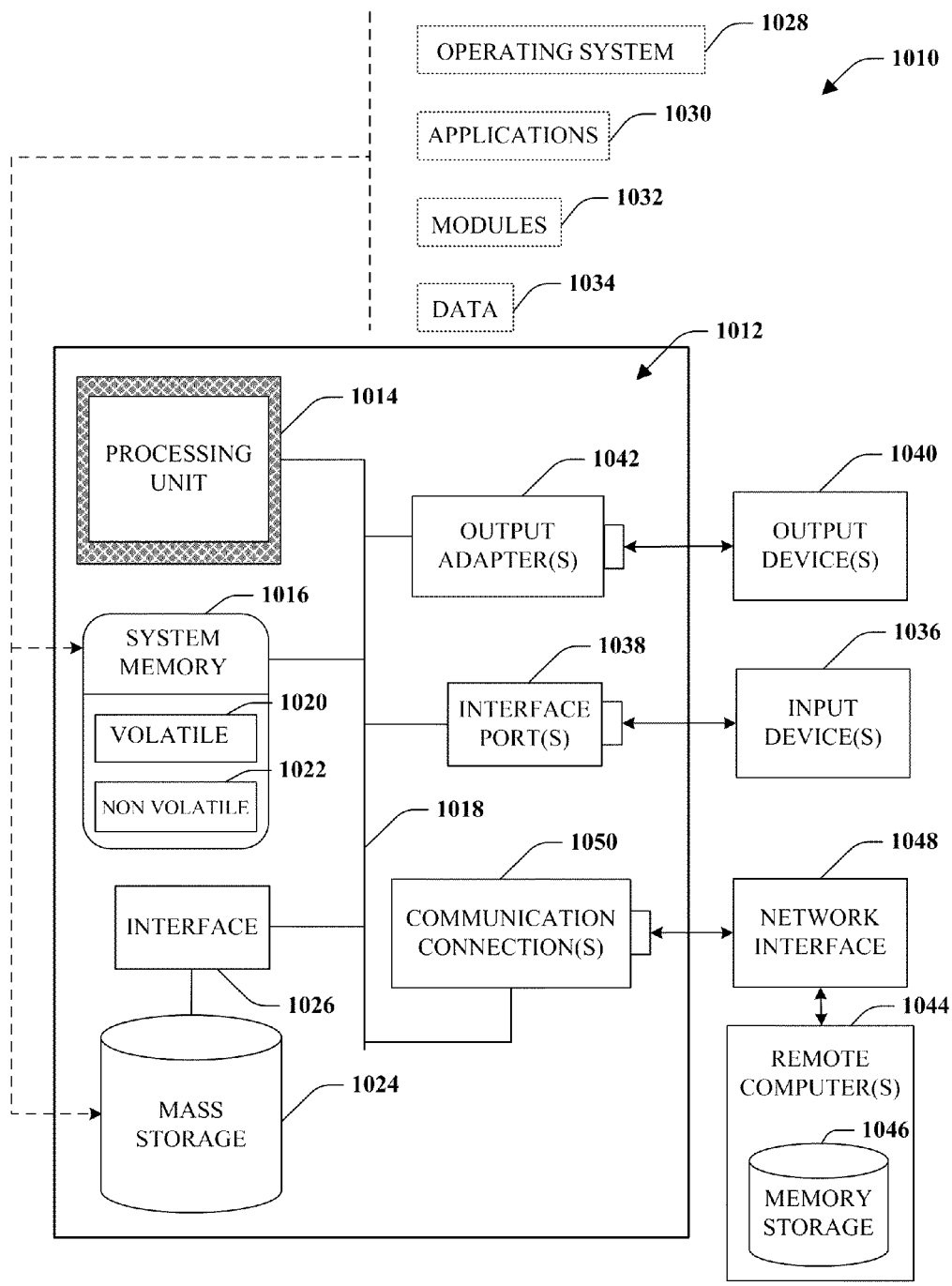
FIG. 10 is a schematic block diagram illustrating a suitable operating environment for aspects of the subject innovation.
Figure 11:
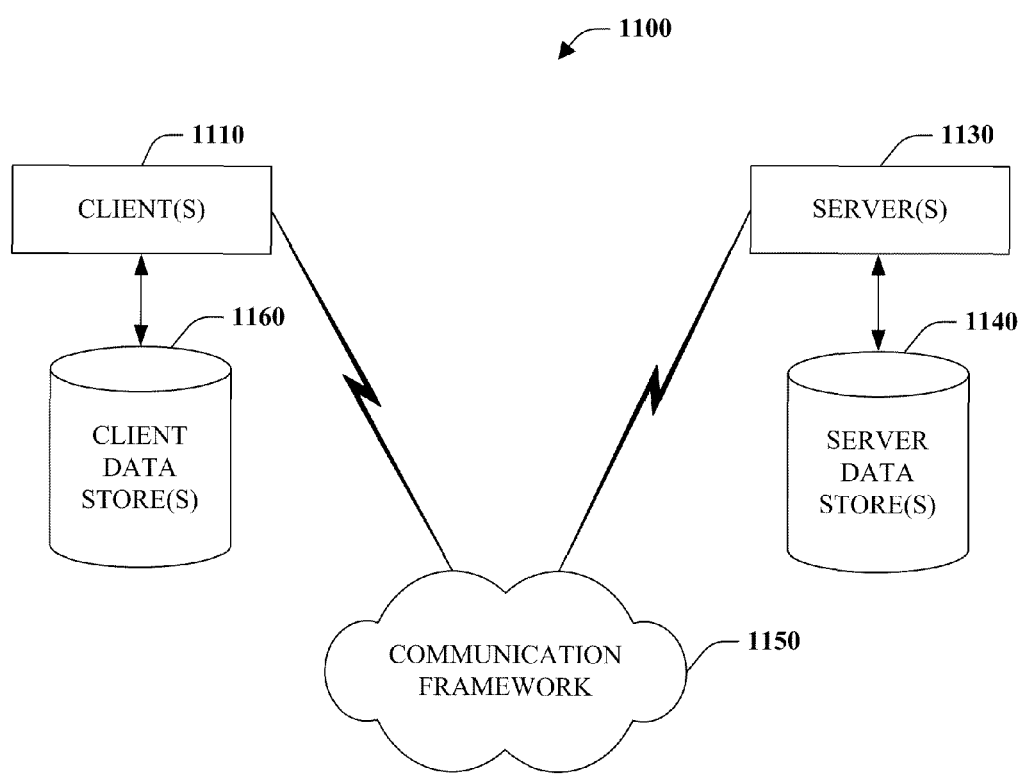
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 10, an exemplary environment 1010 for implementing various aspects disclosed herein includes a computer 1012 (e.g., desktop, laptop, server, hand held, programmable consumer or industrial electronics . . . ). The computer 1012 includes a processing unit 1014, a system memory 1016, and a system bus 1018. The system bus 1018 couples system components including, but not limited to, the system memory 1016 to the processing unit 1014. The processing unit 1014 can be any of various available microprocessors. Dual microprocessors and other multiprocessor architectures (e.g., multi-core) also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory.

Computer 1012 also includes removable/non-removable, volatile/non-volatile computer storage media. FIG. 10 illustrates, for example, mass or auxiliary storage 1024. Mass storage 1024 includes, but is not limited to, devices like a magnetic disk drive, floppy disk drive, tape drive, Jaz drive, Zip drive, LS-100 drive, flash memory card, or memory stick. In addition, mass storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the mass storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on mass storage 1024 and loaded to system memory 1016, acts to control and allocate resources of the system 1012. System applications 1030 take advantage of the management of resources by operating system 1028 through program modules 1032 and program data 1034 stored either in system memory 1016 or on mass storage 1024. It is to be appreciated that the subject innovation can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like displays (e.g., flat panel, CRT, LCD, plasma . . . ), speakers, and printers, among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected (e.g., wired or wirelessly) via communication connection 1050. Network interface 1048 encompasses communication networks such as local-area networks (LAN) and wide-area networks (WAN).

Communication connection(s) 1050 refers to the hardware/software employed to connect the network interface 1048 to the bus 1018. While communication connection 1050 is shown for illustrative clarity inside computer 1016, it can also be external to computer 1012. The hardware/software necessary for connection to the network interface 1048 includes, for exemplary purposes only, internal and external technologies such as, modems including regular telephone grade modems, cable modems, power modems and DSL modems, ISDN adapters, and Ethernet cards or components.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1130. Thus, system 1100 can correspond to a two-tier client server model or a multi-tier model (e.g., client, middle tier server, data server), amongst other models. The server(s) 1130 can also be hardware and/or software (e.g., threads, processes, computing devices). The servers 1130 can house threads to perform transformations by employing the subject innovation, for example. One possible communication between a client 1110 and a server 1130 may be in the form of a data packet transmitted between two or more computer processes.

The system 1100 includes a communication framework 1150 that can be employed to facilitate communications between the client(s) 1110 and the server(s) 1130. The client (s) 1110 are operatively connected to one or more client data store(s) 1160 that can be employed to store information local to the client(s) 1110. Similarly, the server(s) 1130 are operatively connected to one or more server data store(s) 1140 that can be employed to store information local to the servers 1130. By way of example and not limitation, the anonymization systems as described supra and variations thereon can be provided as a web service with respect to at least one server 1130. This web service server can also be communicatively coupled with a plurality of other servers 1130, as well as associated data stores 1140, such that it can function as a proxy for the client 1110.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A system that facilitates private and secure network-based interaction comprising the following computer-implemented components:
   a computer-implemented interface component that receives a network-based communication originated by a user, the interface component resides within a network;
   a computer-implemented simulator component to recommend anonymizing of a source identity included in the network-based communication in response to determining that the anonymizing minimizes inferences made regarding the user, the determining being made based at least on a simulation of a user interaction through the network that includes the network-based communication as guided by a long-term privacy goal of the user; and
   a computer-implemented anonymizer component that, based at least on the recommendation from the simulator component, disguises a source identity of the network-based communication so as to minimize adverse effects on communication capabilities, and transmits the network-based communication that is disguised to a target destination outside the network, wherein the anonymizer component disguises the source identity at least by:
      monitoring network traffic on the network to determine that the user has set preference information for the target destination via a specific cookie value in a current cookie, the preference information enabling the user to conduct a particular type of search query on the target destination, and
      automatically replacing the current cookie with a new cookie that includes the specific cookie value to hold the preference information to enable the user to repeat the particular type of search query on the target destination via the preference information.

2. The system of claim 1, wherein the anonymizer component maps a device IP address to a random address associated with the system such that the random address is utilized to communicate with other devices rather than the device IP address.

3. The system of claim 1, wherein the anonymizer component disguises an intent of the network-based communication.

4. The system of claim 1, wherein the anonymizer component modifies values returned to a script interpreter.

5. The system of claim 1, wherein the anonymizer component augments or deletes one or more client header values associated with a hypertext transport protocol to mask source software identifying information.

6. The system of claim 1, wherein the anonymizer component alters or removes one or more accept header values to obfuscate types of supported communication.

7. The system of claim 1, wherein the new cookie becomes the current cookie after replacement, and wherein the anonymizer component is to repeat the replacement of the current cookie with another new cookie to hold the preference information.

8. The system of claim 1, wherein the network-based communication includes one of voice-over-IP communication, a search query, or a network navigation.

9. The system of claim 1, further comprising at least one of:
   a computer-implemented filter component that controls application of the anonymizer component based on context; or
   a computer-implemented certification component that, in response to a request from the anonymizer component, provides a certificate that authenticates to the target destination that the network-based communication is from an authorized user without revealing the identity of the user.

10. A method, comprising:
    determining that a recommendation for an anonymization of a source identity included in a network-based communication originated by a user minimizes inferences made regarding the user, the determining being made based at least on a simulation of a user interaction through the network that includes the network-based communication as guided by a long-term privacy goal of the user;
    disguising the source identity of the network-based communication following the determining and based on the recommendation by using an anonymizer component to at least:
       determine that the user has set preference information for a target destination via a current cookie, the preference information enabling the user to conduct a particular type of search query on the target destination; and
       automatically replace the current cookie with a new cookie to hold the preference information to enable the user to repeat the particular type of search query on the target destination via the preference information; and
    transmitting the network-based communication that is disguised to the target destination.

11. The method of claim 10, wherein the target destination is outside of the network.

12. The method of claim 10, further comprising mapping, via the anonymizer component, a device IP address to a random address such that the random address is utilized to communicate with other devices rather than the device IP address.

13. The method of claim 10, wherein the disguising the source identity disguises an intent of the network-based communication.

14. The method of claim 10, further comprising modifying, via the anonymizer component, values returned to a script interpreter.

15. The method of claim 10, further comprising augmenting or deleting, via the anonymizer component, one or more client header values associated with a hypertext transport protocol to mask source software identifying information.

16. The method of claim 10, further comprising altering or removing, via the anonymizer component, one or more accept header values to obfuscate types of supported communication.

17. The method of claim 10, wherein the new cookie becomes the current cookie after replacement, and wherein the anonymizer component repeats the replacement of the current cookie with another new cookie to hold the preference information.

18. The method of claim 10, wherein the network-based communication includes one of voice-over-IP communication, a search query, or a network navigation.

19. A system that facilitates private and secure network-based interaction comprising the following computer-implemented components:
- a computer-implemented interface component that receives a network-based communication originated by a user, the interface component resides within a network;
- a computer-implemented simulator component to recommend anonymizing of source identity information included in the network-based communication in response to determining that the anonymizing minimizes inferences made regarding the user, the determining being made based at least on a simulation of a user interaction through the network that includes the network-based communication as guided by a long-term privacy goal of the user; and
- a computer-implemented anonymizer component that disguises a source identity of the network-based communication based at least on the recommendation from the simulator component, wherein the anonymizer component disguises the source identity by implementing at least one of:
  - replacing a current cookie that holds preference information enabling the user to conduct a particular type of search query on a target destination with a new cookie that holds the preference information after a predetermined time interval; and
  - deleting one or more client header values associated with a hypertext transport protocol of the network-based communication to mask source software identifying information.

20. The system of claim 19, wherein the new cookie becomes the current cookie after replacement, and wherein the anonymizer component is to repeat the replacement of the current cookie with another new cookie to hold the preference information after an additional predetermined time interval.

* * * * *